United States Patent Office 3,444,091
Patented May 13, 1969

3,444,091
CLEAR GELS OF AROMATIC OILS AND METHOD OF PREPARING THE SAME
Annmarie G. Petraglia, Bronx, N.Y., assignor to Richardson-Merrell Inc., New York, N.Y., a corporation of Delaware
No Drawing. Continuation-in-part of application Ser. No. 538,550, Mar. 30, 1966. This application Aug. 24, 1967, Ser. No. 662,890
Int. Cl. B01j 13/00
U.S. Cl. 252—316    6 Claims

ABSTRACT OF THE DISCLOSURE

Clear pharmaceutically elegant gels of aromatic oils and water are prepared containing 43 to 60 percent by weight of water, 5 to 25 percent of aromatic oils, 3 to 10 percent of an ethoxylated alcohol having the aliphatic stearyl, palmityl, oleyl, or myristyl groups, and 5 to 26 percent of an ethoxylated alcohol having the aliphatic cetyl or lauryl groups. Up to 6 percent of mineral oil and up to 10 percent of other modifying agents may be added if desired.

RELATED APPLICATIONS

This is a continuation-in-part of application Ser. No. 538,550 filed Mar. 30, 1966 and now abandoned.

BACKGROUND OF THE INVENTION

Many technical articles describing the preparation of clear aqueous oleaginous gels and the physical and chemical requirements for them have been published in recent years. Many specific formulae for clear gels containing up to 50 percent of mineral oils and other oleaginous materials have been described. It would seem therefore that the preparation of such compositions is a matter well within the skill of the art.

Unfortunately, however, it is not as easy to prepare an elegant crystal clear gel with aromatic oils as might appear. It has been found, for example, when attempts using conventional techniques are made to prepare clear gels with water and aromatic oils of the type hereinafter described, the resultant product often has an undesirable hazy and cloudy appearance which adversely affects its pharmaceutical elegance and acceptability, and its physical properties such as stiffness, feel, melting point, and the like are not as acceptable. The present disclosure describes how clear, stable, elegant pharmaceutical gels having excellent physical properties in which water and aromatic oils are the principal components may be prepared.

The term "clear," as used herein, means a transparent, water-white composition free from haze, cloudiness, and murkiness. The term "gel" is used herein in its ordinary sense. The product of the invention is not pourable and does not melt at temperatures up to 40° C. These transparent gels are further characterized by having a dispersed oleaginous phase in which the average particles of the oil are less than about one fourth of the diameter of the wave length of visible light. They are formed with the aid of a combination of surface active agents which reduce the interfacial tension between the aqueous and oil phases to very low values.

To attain the objects of the present invention, it has been discovered that it is necessary that the essential components of the gel be within very narrow percentage limits, for example, the water content must be between 43 and 60 percent by weight, preferably 50 to 54 percent. The aromatic oils which cause the haziness in gels when prepared by other methods must be within the range 5 to 25 percent by weight, preferably 14 to 17 percent. These aromatic oils include various combinations of menthol, camphor, oil of eucalyptus, oil of nutmeg, oil of cedar leaf, thymol, methyl salicylate, and the like. These aromatic oils are commonly used in topical rubs, dispersed in petrolatum, and in other proprietary preparations for their objective and subjective qualities. The composition of the present invention is intended to provide topical rubs and the like containing these aromatic oils and water but being clear, transparent gels of a desirable consistency.

Although gels can be prepared in accordance with the present invention with no mineral oil whatever, it is often found desirable to include small amounts of mineral oil. This can be done by the present invention without destroying the clear, transparent nature of the gel or its desirable physical properties.

Clear, transparent gels of the present invention are prepared with the aid of a particular combination of surfactants. Briefly, the surface active agents should comprise two closely related types of surface active agents in rather narrowly limited proportions. Both types are polyoxyethylene fatty ethers—the fatty acid component containing from 12 through 18 carbon atoms, such as, specifically, the aliphatic radicals lauryl, myristyl, cetyl, stearyl, oleyl, and palmityl. These fatty acid derivatives, as the alcohols, are ethoxylated to form ethers—the ethylene oxide addition varying from 10 moles of oxide to 20 moles of ethylene oxide per molecule of product. They are commercially available under various trade names. The polyoxyethylene cetyl and lauryl ethers tend to produce soft gels when using aromatic oils. The polyoxyethylene stearyl, palmityl, oleyl, and myristyl ethers tend to form firm gels. When the former named ethers are used in preparing the gels of the present invention in amounts of between 15 percent to 26 percent and the latter are used in amounts from 3 percent to 10 percent, a clear, firm, transparent gel having other desirable physical properties is obtained. Of course, mixtures of these various ethers may be used including mixed ethers such as polyoxyethylene cetyl stearyl ethers to provide both of the necessary types of surface active agents that must be used to obtain the desirable gels of the present invention.

The clear gels of the present invention are prepared as follows: The surface active agents are melted (with up to 6 percent of mineral oil, if desired) usually by heating to a temperature of around 60 to 80° C. The system is then cooled slightly to 55 to 65° C. and the aromatic oils are incorporated into the mixture. Water is heated to 60 to 70° C. and the oil-surfactant mixture is slowly poured into the water, or the water into the oil-surfactant mixture, while mixing well and maintaining the temperature of the total mixture at about 55 to 65° C. The resultant composition is then poured into suitable containers such as jars, tubes, and cans which are ready for use when the gel congeals at room temperature.

The above-described composition, while a clear gel at ordinary room temperatures, melts at around 40 to 60° C. and is perfectly clear and transparent when returned to room temperature. Of course, water or oil soluble colorants such as dyes may be added to the composition to achieve desired aesthetic effects. It is also understood that various other modifying agents which add other qualities to the emulsion such as, for example, hydrogenated castor oil, microcrystalline waxes, and other components may be added to the ointment for specific purposes. Small amounts of 1-2-6 hexanetriol and other polyglycols may be added to prevent the development of haze in the gels when they are subjected to freezing and thrawing conditions. The amount of the additional components should not exceed about 10 percent by weight of the gel and when such are added, the amount of water is reduced proportionately while the mineral oil, essential oils, and surfactants remain within the specific proportions named above.

A number of clear aromatic oil gels have been prepared and found to be pharmaceutically elegant, clear, and stable, and have desirable properties for commercial emulsions and rubs. The formulae are as follows. All of these, of course, fall within the scope of the hereindescribed invention.

| | Parts |
|---|---|
| Polyoxyethylene cetyl ether (10 moles ethylene oxide) | 21 |
| Polyoxyethylene oleyl ether (20 moles ethylene oxide) | 5 |
| Aromatic oils | 16 |
| Mineral oils | 5 |
| Water | 53 |

| | |
|---|---|
| Polyoxyethylene cetyl stearyl either (14 moles ethylene oxide) | 17.0 |
| Polyoxyethylene oleyl either (20 moles ethylene oxide) | 4.0 |
| Mineral oil | 4.0 |
| Aromatic oils | 16.0 |
| Water | 59.0 |

| | |
|---|---|
| Polyoxyethylene cetyl stearyl ether (14 moles ethylene oxide) | 23.5 |
| Aromatic oils | 16.0 |
| Mineral oil | 5.0 |
| Water | 55.5 |

| | |
|---|---|
| Polyoxyethylene cetyl stearyl ether (14 moles ethylene oxide) | 23.5 |
| Aromatic oils | 16.0 |
| Mineral oil | 5.0 |
| 1-2-6 hexanetriol | 3.0 |
| Water | 52.5 |

| | |
|---|---|
| Polyoxyethylene cetyl stearyl ether (14 moles eythylene oxide) | 17.7 |
| Polyoxyethylene oleyl ether (20 moles ethylene oxide) | 4.2 |
| Mineral oil | 3.0 |
| Aromatic oil | 16.0 |
| Polyethylene polypropylene polymer (70 moles ethylene oxide) | 2.8 |
| Water | 51.6 |
| 1-2-6 hexanetriol | 4.7 |

| | Percent |
|---|---|
| Polyoxythylene cetyl stearyl alcohol (13 to 15 moles ethylene oxide) | 18–26 |
| Mineral oil | 2–5 |
| 1-2-6 hexanetriol | 3.0 |
| Aromatic oils | 15–17 |
| Water | 42–54 |

| | |
|---|---|
| Polyoxythylene cetyl stearyl alcohol (13 to 15 moles ethylene oxide) | 18–26 |
| 1-2-6 hexanetriol | 4.50 |
| Polyoxyethylene oleyl ether (20 moles ethylene oxide) | 4.05 |

| | Percent |
|---|---|
| Mineral oil | 2–5 |
| Aromatic oils | 16.0 |
| Water | 51.0 |

The aromatic oils used in the foregoing comprised camphor, turpentine, menthol, oil of eucalptus, cedar leaf oil, myristica oil, and other aromatic oils such as thymol in various proportions.

What is claimed is:
1. A clear, transparent, haze-free gel in which the gel-forming components consist essentially of 43 to 60 percent by weight of water, 5 to 25 percent by weight of aromatic oils, 3 to 10 percent by weight of a surfactant of the group consisting of a polyoxyethylene fatty acid ether ethoxylated to between 10 moles to 20 moles of ethylene oxide per mole of product in which the fatty acid moiety thereof is of the group consisting of stearyl, palmityl, myristyl, oleyl, and mixtures thereof, and 15 to 26 percent by weight of a polyoxyethylene fatty acid either ethoxylated to between 10 moles to 20 moles of ethylene oxide per mole of product in which the fatty acid component is of the group consisting of cetyl and lauryl.

2. A clear, transparent, haze-free gel in accordance with claim 1 contains up to 6 percent by weight of mineral oil.

3. A clear, transparent, haze-free gel in accordance with claim 1 in which water is present in amounts of 50 to 54 percent, aromatic oils within the range 14 to 17 percent, mineral oil in an amount of about 3 percent, and in which one of the polyoxyethylene fatty acid ether surfactants is a polyoxyethylene stearyl ether in amounts of 15 to 26 percent and the other surfactant is a polyoxyethylene oleyl ether in amounts of 3 to 10 percent, all parts by weight of the gel.

4. A clear, transparent, haze-free gel in accordance with claim 1 in which the surfactant component of the gel is a polyoxyethylene cetyl/stearyl mixed ether having approximately 14 moles of ethylene oxide per molecule.

5. A clear, transparent, haze-free gel in accordance with claim 1 in which up to 10 percent by weight of the water of the gel is replaced with a polyglycol for preventing the development of haze in the gel on freezing and thawing.

6. A method of preparing the clear, transparent, haze-free gel of claim 1 which comprises slowly mixing the oils and surfactants in a molten condition with the water at a temperature within the range 55 to 65° C. until a uniform mixture is obtained and allowing the mixture to cool.

References Cited

UNITED STATES PATENTS 3,228,842   1/1966   Markland et al. _____ 252—316 X

RICHARD D. LOVERING, *Primary Examiner.*

U.S. Cl. X.R.

252—312; 424—168, 195, 332